Figures 1, 2, 3:
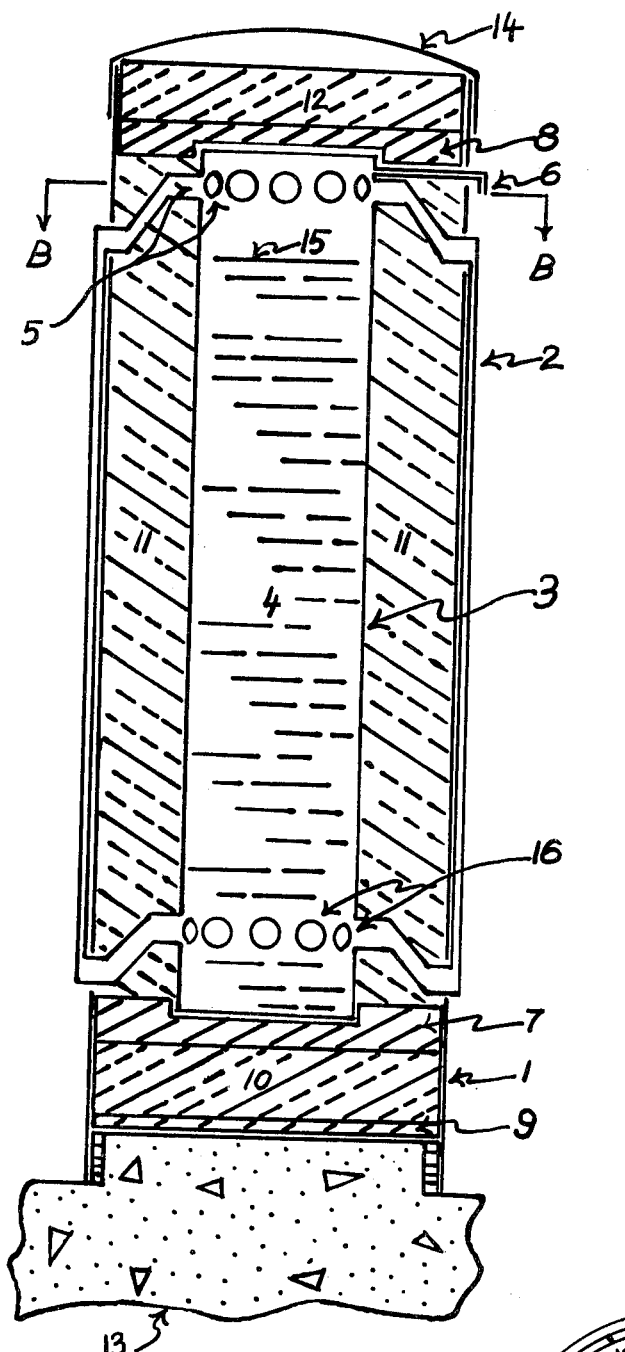

United States Patent [19]

Holland

[11] 4,419,983

[45] Dec. 13, 1983

[54] DEVICE FOR PASSIVE SOLAR HEATING AND STORAGE OF A LIQUID

[76] Inventor: Beecher J. Holland, 600 Morison Ave., Kingsport, Tenn. 37660

[21] Appl. No.: 305,972

[22] Filed: Sep. 28, 1981

Related U.S. Application Data

[63] Continuation-in-part of Ser. No. 73,099, Sep. 6, 1979, abandoned, which is a continuation-in-part of Ser. No. 34,295, Apr. 30, 1979, abandoned, which is a continuation-in-part of Ser. No. 851,053, Nov. 14, 1977, abandoned.

[51] Int. Cl.³ .................................................. F24J 3/02
[52] U.S. Cl. .................................. 126/434; 126/437; 126/442
[58] Field of Search ............... 126/433, 434, 437, 438, 126/442, 444, 445, 450

[56] References Cited

U.S. PATENT DOCUMENTS

| | | | |
|---|---|---|---|
| 1,258,405 | 3/1918 | Harrison | 126/437 |
| 1,658,455 | 2/1928 | Metzech et al. | |
| 2,257,524 | 9/1941 | DeBogory | |
| 2,402,326 | 6/1946 | Harkness | 126/437 |
| 3,949,732 | 4/1976 | Reines | 126/430 |
| 4,069,810 | 1/1978 | Tabor | 126/443 |
| 4,136,674 | 1/1979 | Korr | 126/443 |
| 4,185,616 | 1/1980 | Johnson | 126/443 |
| 4,186,721 | 2/1980 | Whitman | 126/443 |

FOREIGN PATENT DOCUMENTS

| | | | |
|---|---|---|---|
| 2280036 | 7/1976 | France | 126/443 |
| 74 25399 | of 1976 | France | |

*Primary Examiner*—Samuel Scott
*Assistant Examiner*—Margaret A. Focarino

[57] ABSTRACT

The invention is a passive, stationary solar collector. The collector is a cylinder of essentially circular cross section set in a fixed position with its longitudinal axis laying essentially in a vertical north-south plane and at appropriate angle to the local horizontal plane of the earth. Liquid-carrying, heat-absorbing conduits run lengthwise on the external surface of said cylinder and convey heated liquid to the upper part of a reservoir internal to said cylinder. The conduits obtain cooler liquid from the lower part of said reservoir. Cooling of reservoir contents, during periods of low radiation, by relatively warmer liquid rising in the conduits from the lower part of said reservoir is prevented by a liquid density trap.

1 Claim, 3 Drawing Figures

DEVICE FOR PASSIVE SOLAR HEATING AND STORAGE OF A LIQUID

The present application is a continuation-in-part of Ser. No. 06/073,099 filed on Sept. 6, 1979 and now abandoned, which was a continuation-in-part of Ser. No. 034,295 filed on Apr. 30, 1979, now abandoned, which was a continuation-in-part of Ser. No. 851,053 filed Nov. 14, 1977 now abandoned.

The present invention relates to solar collectors, more particularly those for which the absorber elements are disposed in a cylindrical pattern of essentially circular cross section. The collector is comprised of an insulating support base, a vertically disposed reservoir tank mounted on said base, a plurality of tubular conduits arranged on the circumference of a cylinder surrounding said reservoir, the longitudinal axis of said cylinder laying essentially in a vertical north-south plane, a plurality of lower tubes, each tube being in fluid communication with the lower end of said reservoir tank and the lower end of one of said conduits wherein the points, whether lower or upper, of communication with said conduits are lower than the corresponding points of communication with said reservoir tank, a plurality of upper tubes, each tube being in fluid communication with the upper end of said reservoir tank and the upper end of one of said conduits. In one embodiment, each conduit would have a flow channel of essentially constant thickness in cross section and be curved in cross section to essentially maintain the curvature of said cylinder. In a second embodiment, each conduit would have a flow channel of essentially constant thickness in cross section and be essentially flat in cross section. The collector is free of manual or powered adjustment requirements for solar tracking.

An earlier application, Metzech, of a cylindrical absorber used lenses having partially reflective surfaces followed by the absorber with its partially reflective surface, resulting in multiple diminution of available radiation prior to absorbtion. Additionally, the necessary lens-supporting-and-adjusting structure and mechanism intercepts a signifigant portion of radiation thereby preventing it from reaching the absorber. Also, some radiation passes between lenses, never reaching the absorber. The present invention "sees" the full extent of incoming radiation within its purview and so will realize greater total energy absorbtion than a comparable "Metzech" model. Additionally, Metzech requires some solar tracking adjustment.

Acircular cylindrical collector has been presented by Vincee. In a particular mode of operation, this device could collect heat and transfer the heated liquid to storage in a passive manner, but it could not avoid simultaneous circulation in and cooling by the unirradiated collector elements opposite the side exposed to the sun. After sunset, all elements would act to cool the liquid in storage. The present invention avoids this problem by having the point of liquid communication with the bottom of each element lower than the corresponding point of communication with the reservoir. This forms a trap where high density cooled liquid gathers and the relatively warmer liquid in the reservoir does not tend to enter into the trap because it is warmer and thus less dense.

The principle object of the invention is to offer a circular-cylindrical collector with passive heat collection, transfer to storage and retention in storage while minimizing heat loss from storage.

Objects and advantages of the invention will be clarified hereinafter from consideration of the specification with reference to the accompanying drawings forming part thereof and in which like numerals correspond to like parts in the two figures showing one embodiment of the invention, and wherein:

FIG. 1 is a sectional view from the front (the view seeing the noon sun) of an assembly of liquid conduit elements (section A—A as shown on FIG. 2) and FIG. 2 is a top view of the complete embodiment sectioned in FIG. 1 showing section B—B marked on FIG. 1 and FIG. 3 is a cross section of a collector element of flat cross section.

Referring to the drawings, one embodiment of the improved solar collector is comprised of a circular cylinder 1 set on end at appropriate true polar azimuth and angle to the local horizontal plane of the earth.

The absorber elements 2 are tubular liquid conduits located longitudinally along the length of said cylinder and laying essentially in vertical north-south planes. Each of said elements has a flow channel of essentially constant thickness in cross section, yet is curved in cross section as required to essentially maintain the curvature of said cylinder, radiation being received by the convex side of the tube. Tube width may be such as to allow use of a flat tube cross section as shown by FIG. 3. Less roundness of the element cross section, with constant element wall thickness, increases the ratio of absorbing area per mass unit of liquid flowing, increasing sensitivity to available radiation and producing hot fluid at lower levels of radiation.

Each element 2 communicates with a tank 3 internal to cylinder 1 by means of a tubular connection between an opening in the vicinity of each extremity of each element and a corresponding opening near the corresponding end of tank 3, the openings in the vicinity of the element extremities being at lower elevations than their corresponding openings in reservoir tank 3. A liquid 4, with appropriate cubic expansion characteristics (as kerosene or turpentine) fills tank 3 to some level 15 appropriate to the liquid. Vent 6 avoids internal vapor pressure in tank 3 being different from atmospheric. Members 7 and 8 are positioning-supporting provision for tank 3. Member 9 is supporting provision for insulation area 10. Other insulation areas are 11 and 12. Concrete member 13 supports and restrains the entire assembly of FIG. 1. Dome 14 facilitates runoff of precipitation and protects the top of assembly of FIG. 1 from atmospheric conditions.

In operation, collecting elements occupy positions on the circumference of the cylinder and solar radiation impinges on said elements. As the run rises, the nearest 180 degree portion of the cylinder's circumferential surface is exposed to solar radiation. As the period of daylight continues, succeeding 180 degree portions of the cylindrical circumferential area are exposed to solar radiation. Solar radiation on tube 2 causes liquid in the tube to expand and such expansion of an appropriate liquid is sufficient to cause it to spill over into reservoir tank 3 whereupon replacement relatively cooler liquid flows into tube 2 from opening 16 to be heated. In tank 3, hottest liquid gathers in the upward portion of the tank, yet it can not go back into tube 2 through opening 5 to be cooled when radiation is not available. When radiation is absent, liquid 4 in the vicinity of openings 16 at the lower end of tank 3 though relatively warmer than tube 2 does not tend to reenter tube 2 through opening 16 because the opening in tube 2 connecting to opening 16 is lower and more dense liquid resides there.

I claim:

1. A passively operating solar collector comprising: an insulating support base, a vertically disposed reservoir tank mounted on said base, a plurality of essentially straight tubular conduits arranged longitudinally on the circumference of a cylinder surrounding said reservoir, the longitudinal axis of said cylinder laying essentially in a vertical north-south plane, a plurality of lower tubes, each tube being in fluid communication with the lower end of said reservoir tank and the lower end of one of said conduits wherein the point of communication of each of said lower tubes with said conduit is lower than the corresponding point of communication with said reservoir tank, a plurality of upper tubes, each tube being in fluid communication with the upper end of said reservoir tank and the upper end of one of said conduits, wherein the working fluid level in the reservoir in normal operation stands below the point of communication of each of said upper tubes with the upper end of said reservoir tank, and wherein the point of communication of each of said upper tubes with said conduit is lower than the corresponding point of communication with said reservoir tank.

* * * * *